UNITED STATES PATENT OFFICE.

ERNST H. RICHTER, OF TAUNTON, MASSACHUSETTS.

IMPROVEMENT IN FIRE-BRICKS, STOVE-LININGS, &c.

Specification forming part of Letters Patent No. 149,338, dated April 7, 1874; application filed February 23, 1874.

*To all whom it may concern:*

Be it known that I, ERNST H. RICHTER, of Taunton, in the county of Bristol and State of Massachusetts, have invented a new and Improved Composition for Stove-Linings, Fire-Brick, &c., of which the following is a specification:

This invention is the result of further investigations and experiments on the composition for which Letters Patent No. 145,448 were granted me December 9, 1873.

The present invention consists in the addition of pulverized raw or burnt mica to raw or burnt oyster-shells, whereby, if clay or sand, or both, are further added, a composition is obtained which will resist the action of fire for a very long time, and also effectually resist the usual effects of atmospheric changes—rain, heat, cold, dry, or moist temperature, &c.

Mica—that is, crystallized gypsum—is found in large quantities in nearly all parts of the United States, and is a cheap and readily obtainable substance. It combines readily with the lime of the oyster-shells, and makes, in conjunction with them, and when burned, a strong and reliable compound.

My composition consists of the following ingredients, in about the proportions set forth: Fifty pounds raw or burnt mica, and forty pounds raw or burnt oyster or other shells. The mixture is combined with water, molded, and burned, the ingredients being pulverized before mixing.

By careful experiments I have found that even when the proportions of the above-named ingredients are varied a superior stove-lining or fire-brick will be produced; also, that clay may be added to the compound if it is desired to obtain greater adhesiveness, and that sand may be added when greater strength and weight is to be secured; but I do not wish it to be understood that clay and sand are necessary for carrying my invention into effect.

The stove lining, composed of mica and shells, as stated, is very light, but at the same time sufficiently strong, and has the great advantage that it will not clinker. Neither will it clinker when clay or sand is added; but then it will be necessarily heavier and less porous. For fire-brick that may have to carry great weight, the addition of clay or sand may, therefore, be desirable, but otherwise not.

By the word "mica" in this specification I mean mica in the form in which it is found in the soil, and not necessarily the purified mica.

I claim as my invention—

The stove-lining or fire-brick composed of mica and shells, as described.

ERNST H. RICHTER.

Witnesses:
 GEO. H. BABBITT, Jr.,
 B. R. HOLT.